US012688967B2

(12) United States Patent
Yen

(10) Patent No.: US 12,688,967 B2
(45) Date of Patent: Jul. 21, 2026

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 1050 days.

(21) Appl. No.: 17/644,340

(22) Filed: Dec. 15, 2021

(65) Prior Publication Data

US 2023/0097424 A1 Mar. 30, 2023

(30) Foreign Application Priority Data

Sep. 28, 2021 (TW) ................................ 110136116

(51) Int. Cl.
*H01F 27/28* (2006.01)
*H01F 27/40* (2006.01)

(52) U.S. Cl.
CPC ............ *H01F 27/40* (2013.01); *H01F 27/28* (2013.01)

(58) Field of Classification Search
CPC ...... H01F 27/40; H01F 27/28; H01F 27/2804; H01F 21/12
See application file for complete search history.

(56) References Cited

U.S. PATENT DOCUMENTS 7,202,768 B1 4/2007 Harvey et al.
10,128,033 B2 11/2018 Yen et al.
2005/0068146 A1* 3/2005 Jessie .................... H10D 84/00 336/200
2008/0297298 A1* 12/2008 Wei ........................ H01F 21/12 336/200
2012/0223796 A1* 9/2012 Huang .................... H01F 21/12 336/142
2015/0348702 A1* 12/2015 Yen ........................ H01F 21/12 336/192
2019/0279809 A1 9/2019 Yen

FOREIGN PATENT DOCUMENTS

CA 3027397 A1 * 6/2019 ............ H01F 38/14
TW 201430874 A 8/2014
TW I748846 B 12/2021

* cited by examiner

*Primary Examiner* — Tuyen T Nguyen
(74) *Attorney, Agent, or Firm* — CKC & Partners Co., LLC

(57) ABSTRACT

An inductor device includes an inductor element, a substrate and a ground plane is disclosed. The ground plane includes several sub ground planes. The inductor element is set above the substrate, and the substrate is set above the ground plane. When at least one of several connection relationships between the several sub ground planes change, an inductance value of the inductor element changes.

15 Claims, 4 Drawing Sheets

INDUCTOR DEVICE

CROSS-REFERENCE TO RELATED APPLICATION

This application claims the priority benefit of TAIWAN Application serial no. 110136116, filed Sep. 28, 2021, the full disclosure of which is incorporated herein by reference.

FIELD OF INVENTION

The invention relates to an inductor device, more particularly, the invention relates to an inductor device of an integrated inductor.

BACKGROUND

The existing inductors of various types, such as spiral-type inductors, figure eight inductors, and so on, include their advantages and disadvantages. However, the mutual inductance and coupling of spiral-type inductors often occur between the coils, and the eight-shaped inductor occupies a larger area in the device.

Therefore, it is desirable to provide an inductor device to provide different inductance values, so as to expand the usage range of the inductor device and maintain the quality factor of the inductance.

SUMMARY

An aspect of this disclosure is to provide an inductor device. The inductor device includes an inductor element, a substrate and a ground plane. The ground plane includes several sub ground planes. The inductor element is set above the substrate, and the substrate is set above the ground plane. When at least one of several connection relationships between the several sub ground planes changes, an inductance value of the inductor element changes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The term "coupled" used in the article can also refer to "electrical coupling", and the term "connected" can also refer to "electrical connection". "Coupling" and "connection" can also be referred to two or more components that cooperate or interact with each other.

Figure 1:
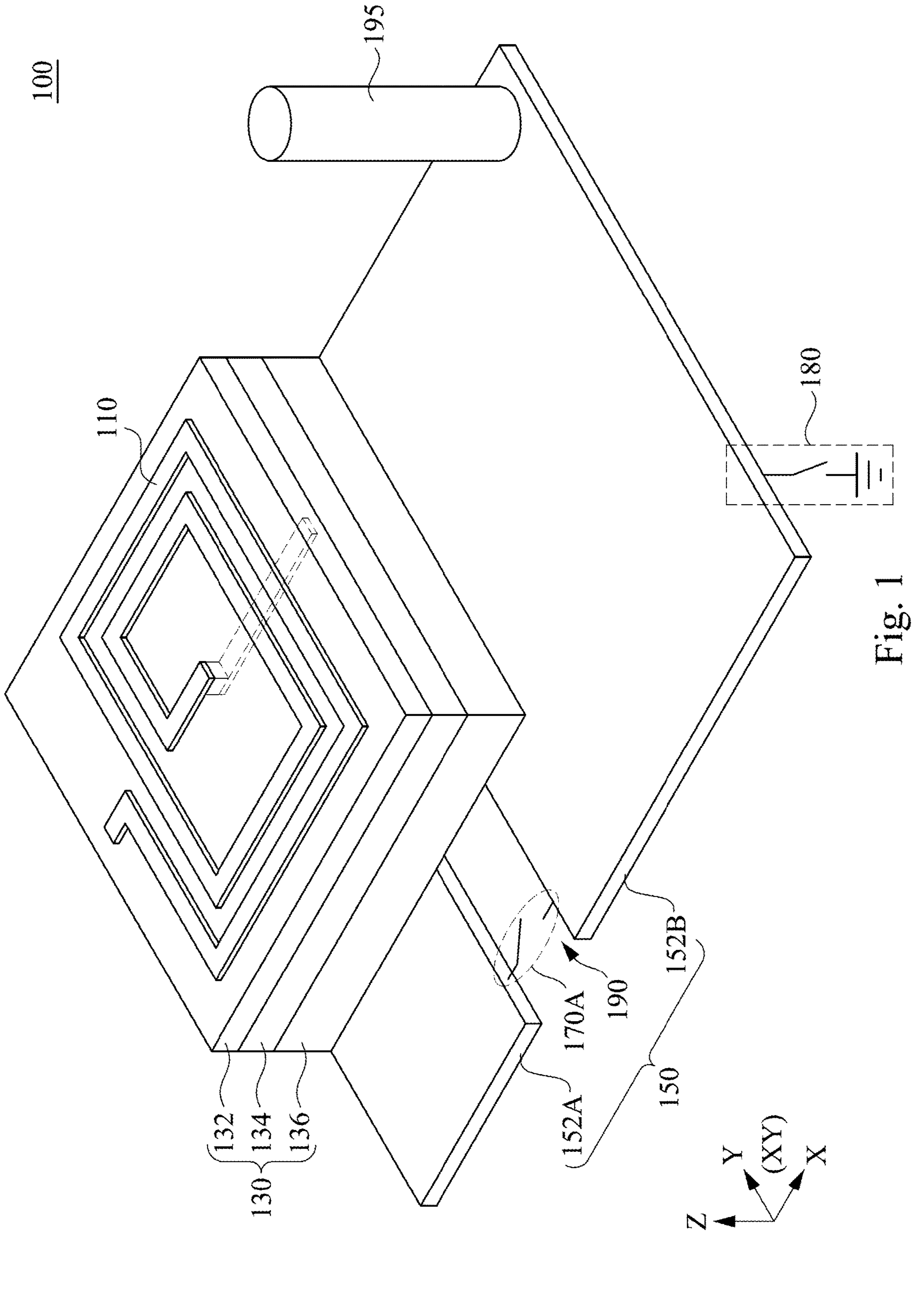
FIG. 1 is a schematic diagram illustrating an inductor device according to some embodiments of the present disclosure.

Reference is made to FIG. 1. FIG. 1 is a schematic diagram illustrating an inductor device 100 according to some embodiments of the present disclosure. The inductor device 100 includes an inductor element 110, a substrate 130 and a ground plane 150. As illustrated in FIG. 1, the inductor element 110, the substrate 130 and the ground plane 150 parallel to the XY plane formed by the X direction and the Y direction respectively. The X direction is perpendicular to the Y direction. The inductor element 110 is set on the substrate 130, and the substrate 130 is set on the ground plane 150. The vertical projection of the inductor element 110 on the XY plane, the vertical projection of the substrate 130 on the XY plane and the vertical projection of the ground plane 150 on the XY plane overlap each other.

Furthermore, the ground plane 150 includes several sub ground planes 152A and 152B. In the embodiment of FIG. 1, both of the sub ground planes 152A and 152B are parallel to the XY plane formed by the X direction and the Y direction. Furthermore, the vertical projection of the sub ground plane 152A on the XY plane and the vertical projection of the sub ground plane 152B on the XY plane do not overlap.

The inductor device 100 further includes a switch 170A. The switch 170A is configured to connect the sub ground plane 152A and the sub ground plane 152B, and the switch 170A is configured to control a connection relationship between the sub ground plane 152A and the sub ground plane 152B. In some embodiments, when the switch 170A is conducted, the connection relationship between the sub ground plane 152A and the sub ground plane 152B is connected, and when the switch 170A is not conducted, the connection relationship between the sub ground plane 152A and the sub ground plane 152B is not connected.

The inductance value of the inductor element 110 changes when the conducting state of the switch 170A changes. When the connection relationship between the sub ground plane 152A and the sub ground plane 152B changes, the inductance value of the inductor element 110 changes. That is, the inductance value of the inductor element 110 when the switch 170A is conducted is different from the inductance value of the inductor element 110 when the switch 170A is not conducted.

In some embodiments, the inductor device 100 further includes a switch 180. The switch 180 is configured to control a grounding relationship of a ground plane 150. When the grounding relationship of the ground plane 150 changes, the inductance value of the inductor element 110 changes.

When the switch 180 is conducted, the grounding relationship of the sub ground plane 152B is grounded. Moreover, when the switch 180 is not conducted, the grounding relationship of the sub ground plane 152B is floating (not grounded).

In some other embodiments, when both of the switch 170A and the switch 180 are conducted, both of the sub ground planes 152A and 152B are grounded through the switch 180. The inductance value of the inductor element 110 changes when the conducting state of the switch 180 changes. That is, the inductance value of the inductor element 110 when the switch 180 is conducted is different from the inductance value of the inductor element 110 when the switch 180 is not conducted.

The situation as shown in FIG. 1 is the situation that only the sub ground plane 152B is connected to the switch 180.

In some other embodiments, the sub ground plane 152A can also be connected to another switch for grounding.

Figure 2:
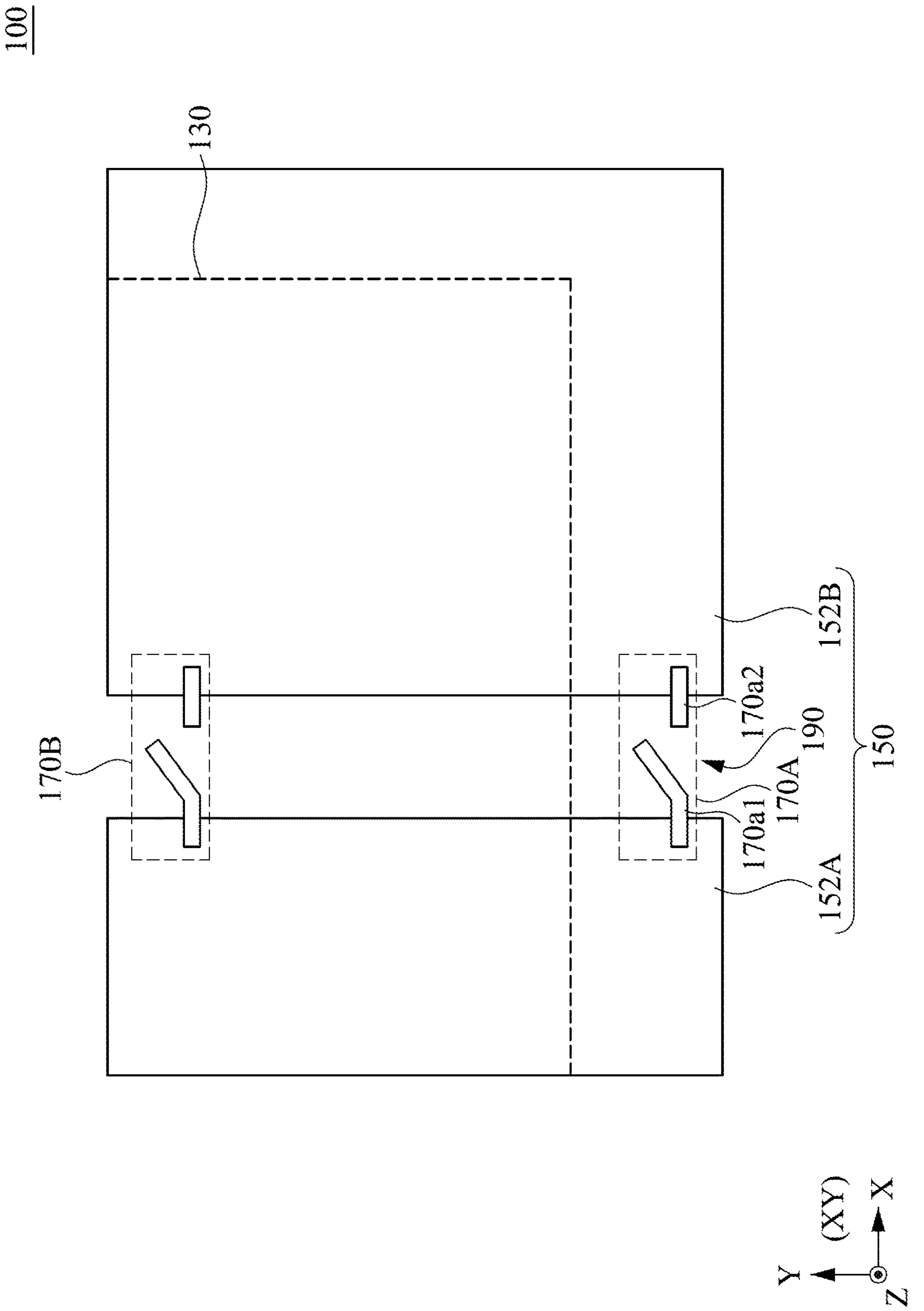
FIG. 2 is a bottom view diagram illustrating an inductor device according to some embodiments of the present disclosure.

Reference is made to FIG. 2. FIG. 2 is a bottom view diagram illustrating an inductor device 100 according to some embodiments of the present disclosure. In some embodiments, the sub ground plane 152A and the sub ground plane 152B are connected through the switches 170A and 170B.

In detail, the switch 170A further includes a sub switch **172*a*1 and a sub switch 172*a*2. The sub switch 172*a*1 is connected to the sub ground plane 152A, and the sub switch 172*a*2 is connected to the sub ground plane 152B. When the sub switches 172*a*1 and sub switch 172*a*2 are connected to each other, the switch 170A is conducted. Moreover, when it is not conducted between the sub switch 172*a*1 and the sub switch 172*a*2, the switch 170A is not conducted. The numbers and connection positions of the switches as shown in FIG. 2** are only for illustrative purposes only, and the embodiments of the present disclosure are not limited thereto.

As illustrated in FIG. 2, in some embodiments, the substrate 130 is set at one side of the ground plane 150, and the switches 170A and 170B are set at another side of the ground plane 150.

In some embodiments, an opening 190 is included between the sub ground plane 152A and the sub ground plane 152B. In FIG. 1 and FIG. 2, the opening 190 extends along the Y direction. However, the embodiments of the present disclosure are not limited thereto. The extension directions of various openings are all within embodiments of the present disclosure, for example, X direction, the direction that is in 45 degrees to the X direction, etc.

Furthermore, the vertical projection of the opening 190 on the XY plane and the vertical projection of the inductor element 110 on the XY plane overlaps. That is, the opening 190 is located below the inductor element 110.

Figure 3:
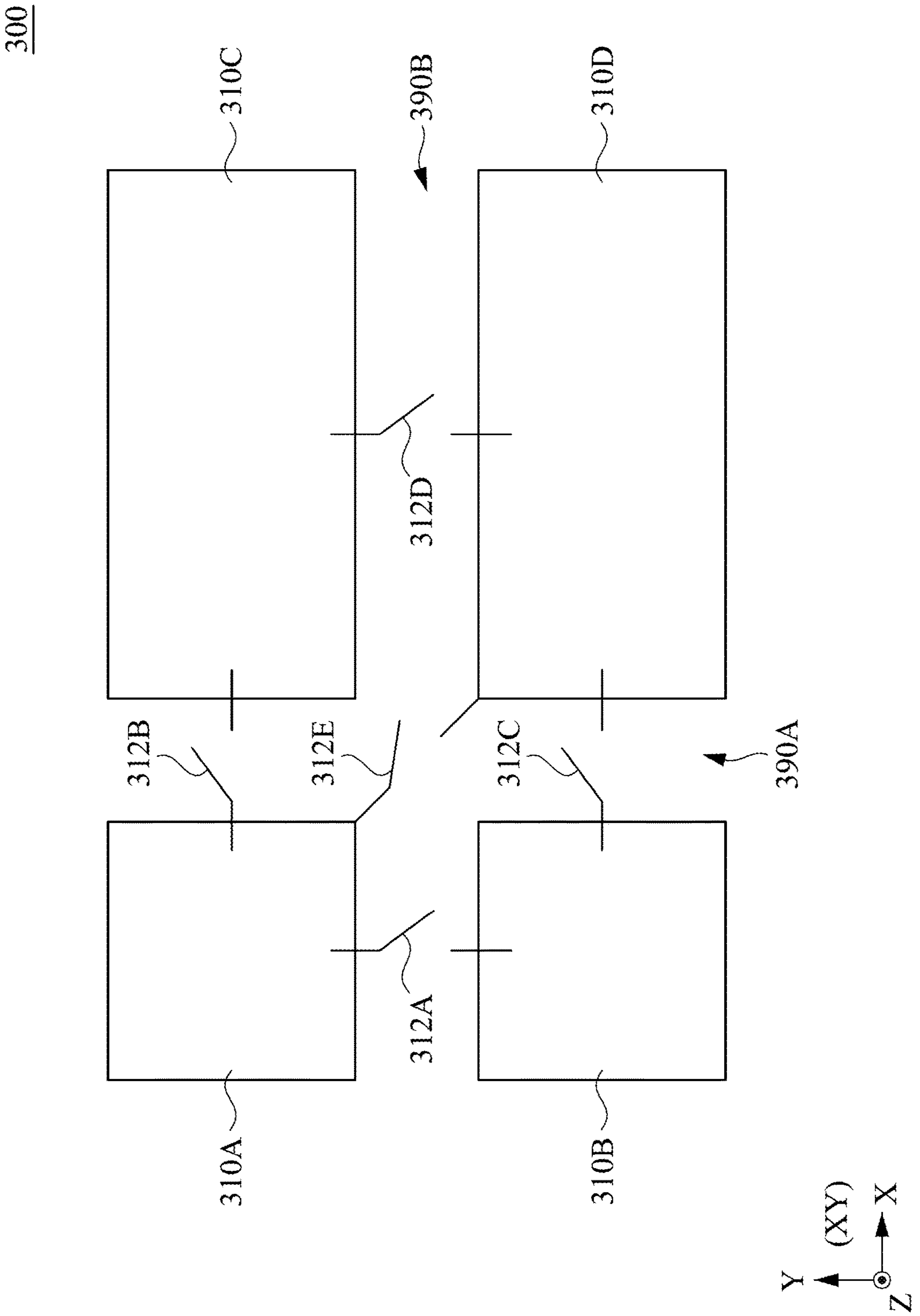
FIG. 3 is a schematic diagram illustrating another inductor device according to some embodiments of the present disclosure.

Reference is made to FIG. 3. FIG. 3 is a schematic diagram illustrating another inductor device 300 according to some embodiments of the present disclosure. In some other embodiments, the ground plane 150 in FIG. 1 may include several sub ground planes 310A to 310D. The several sub ground planes 310A to 310D are also connected by several switches 312A to 312E. The conduction of several switches 312A to 310E can be independent of each other, and can also be conducted or not conducted at the same time.

As the several switches 312A to 312E are conducted or not, the several connection relationships between the several sub ground planes 310A to 310D change, and the inductance value of the inductor element 110 as illustrated in FIG. 1 also changes as the connection relationships between the several sub ground planes 310A to 310D change.

Furthermore, as illustrated in FIG. 3, the inductor device 300 includes the openings 390A and 390B. The opening 390A extends along the Y direction, and the opening 390B extends along the Y direction. The openings 390A and 390B as illustrated in FIG. 3 are for illustrative purposes only, and several extension directions of the openings are within the embodiments of the present disclosure.

Reference is made to FIG. 1 again. In some embodiments, the inductor device 100 further includes the through silicon via (TSV) 195. The through silicon via 195 is connected to the ground plane 150 and extends in the Z direction. The Z direction is perpendicular to the XY plane. That is, the through silicon via 195 is perpendicular to the ground plane 150. The through silicon via 195 connects the substrate 130 to the ground plane 150.

As illustrated in FIG. 1, the through silicon via 195 is connected to the sub ground plane 152B, and the through silicon via 195 is perpendicular to the sub ground plane 152B. The diagram in FIG. 1 includes only one through silicon via 195 connected to the sub ground plane 152B. However, in some other embodiments, the inductor device 100 includes several through silicon via 195. For example, in some embodiments, the sub ground plane 152A also includes the through silicon via 195.

In some embodiments, when the ground plane 150 is grounded directly, the grounding relationship between the inductor element 110 and the substrate 130 can be controlled by the conduction of the through silicon via 195, and the inductance value of the inductor element 110 can be changed.

For example, when the through silicon via 195 is conducted, the inductor element 110 and the substrate 130 are connected to the ground plane 150 and then grounded. And when the through silicon via 195 is not conducted, the inductor element 110 and the substrate 130 are not connected and the ground plane 150 is not grounded. When the conduction status of the through silicon via 195 changes, the inductance value of the inductor element 110 also changes.

In some embodiments, the substrate includes the silicon oxide layer 132, the silicon nitride layer 134 and the silicon layer 136. The silicon oxide layer 132 is set on the silicon nitride layer 134, and the silicon nitride layer 134 is set on the silicon layer 136. The silicon oxide layer 132, and both of the silicon nitride layer 134 and the silicon layer 136 are parallel to the XY plane formed by the X direction and the Y direction, and the silicon nitride layer 134 and the silicon layer 136 overlap each other.

Figure 4:
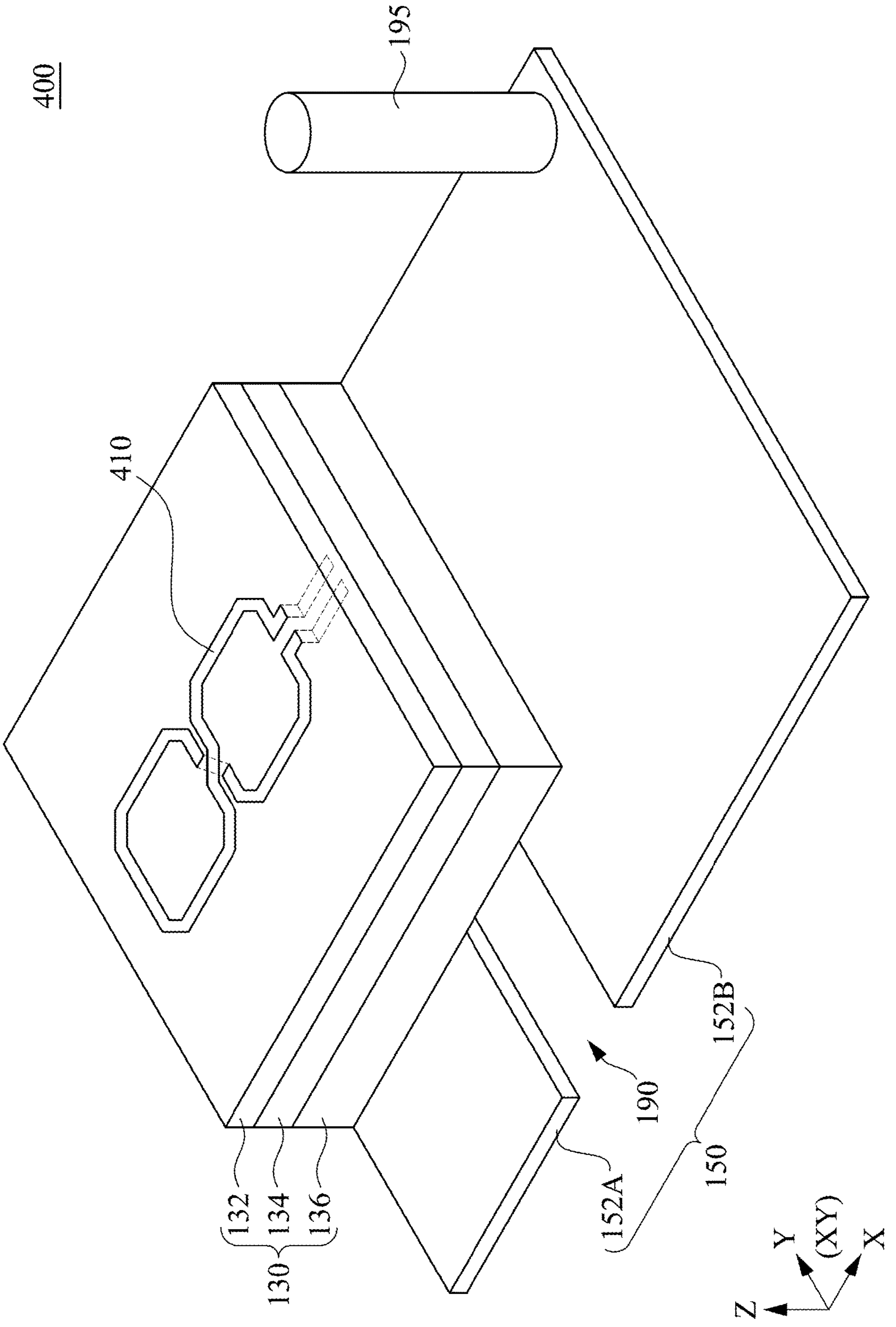
FIG. 4 is a schematic diagram illustrating another inductor device according to some embodiments of the present disclosure.

Reference is made to FIG. 4. FIG. 4 is a schematic diagram illustrating another inductor device 400 according to some embodiments of the present disclosure. The difference between FIG. 4 and FIG. 1 lies in the type of inductor element. The rest of FIG. 4 is the same or similar to FIG. 1. The inductor element 110 as illustrated in FIG. 1 is a single ended inductor element. In some other embodiments, as illustrated in FIG. 4, the inductor element 410 can also be a differential inductor element.

In some embodiments, when the inductor element 110 is the single ended inductor element, the inductance value of the inductor element 110 effectively changes with the ground plane 150 being grounded or not, and the inductance value of the inductor element 110 effectively changes as the connection relationships of the several sub ground planes 152A and 152B change.

In some other embodiments, as illustrated in FIG. 4, when the inductor element 410 is a differential inductor element, effect of changing of the inductance value of the inductor element 410 by the grounding status of the ground plane 150 is low. However, the inductance value of the inductor element 410 still changes effectively with the changes of the connection relationships of several sub ground planes 152A and 152B.

According to embodiments of the present disclosure, it is understood that the embodiments of the present disclosure provide an inductor device. The connection relationship between several sub ground planes, the grounding relationships of the ground planes, the grounding relationships of the sub ground planes, and the grounding relationships of the inductor elements, etc., can be changed by the operation of the switches to effectively change the inductance value of the inductor element. In the embodiments of the present disclosure, by changing the inductance value of the inductor element, the quality (Q value) of the inductor element can also be effectively maintained. That is, in the embodiments of the present disclosure, the inductance value of the inductor element can be changed while maintaining the operating Q value of the inductor element.

Various functional elements have been disclosed herein. For those skilled in the art, functional elements can be implemented by circuits (whether a dedicated circuit or a general-purpose circuit operated under the control of one or more processors and coded instructions).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inductor device, comprising:

an inductor element;

a substrate;

a ground plane, comprising a plurality of sub ground planes, wherein the inductor element is set above the substrate, and the substrate is set above the ground plane; and at least one first switch, connected between the plurality of sub ground planes, wherein an inductance value of the inductor element changes according to whether at least one of a plurality of connection relationships between the sub ground planes changes from connected to disconnected or from disconnected to connected, wherein the at least one first switch is configured to control the plurality of connection relationships between the plurality of sub ground plane.

2. The inductor device of claim 1, wherein the plurality of sub ground planes comprise a first sub ground plane and a second sub ground plane, wherein between the first sub ground plane and the second sub ground plane comprises a third switch of the at least one first switch, and between the first sub ground plane and the second sub ground plane comprises a first connection relationship of the plurality of connection relationships, wherein when the third switch is conducted, the first connection relationship is connected, and when the third switch is not conducted, the first connection relationship is not connected.

3. The inductor device of claim 2, wherein the third switch comprises:

a first sub switch, connected to the first sub ground plane; and a second sub switch, connected to the second sub ground plane.

4. The inductor device of claim 3, wherein when the first sub switch and the second sub switch are conducted, the third switch is conducted; wherein when the first sub switch and the second sub switch are not conducted, the third switch is not conducted.

5. The inductor device of claim 1, further comprising:

at least one second switch, configured to control the ground plane to be either grounded or floated, wherein the inductance value of the inductor element differs depending on whether the ground plane is grounded or floated.

6. The inductor device of claim 5, wherein the plurality of sub ground planes comprise a first sub ground plane, the at least one second switch comprises a fourth switch, and the first sub ground plane and the fourth switch are connected, wherein when the fourth switch is conducted, the first sub ground plane is grounded, and when the fourth switch is not conducted, the first sub ground plane is floated.

7. The inductor device of claim 1, further comprising:

a through silicon via (TSV), connected to the substrate and the ground plane, and is perpendicular to the ground plane.

8. The inductor device of claim 1, further comprising:

a through silicon via, connected to the substrate and one of the plurality of sub ground planes, and perpendicular to the one of the plurality of sub ground planes.

9. The inductor device of claim 8, wherein when the ground plane is directly grounded and the inductor element and the substrate are connected to the ground plane through the through silicon via, the inductor element and the substrate are grounded, and when the ground plane is directly grounded but the inductor element and the substrate are not connected to the ground plane through the through silicon via, the inductor element and the substrate are not grounded.

10. The inductor device of claim 1, wherein the plurality of sub ground planes comprise a first sub ground plane and a second sub ground plane, and between the first sub ground plane and the second sub ground plane comprises an opening.

11. The inductor device of claim 10, wherein the inductor element is set above the opening, and the inductor element partially overlaps with the opening.

12. The inductor device of claim 1, further comprising: at least one second switch, connected to at least one of the plurality of sub ground planes, configured to control a grounding relationship of the ground plane.

13. The inductor device of claim 12, wherein the substrate is set at a first side of the ground plane, and the at least one first switch is set at a second side of the ground plane, wherein one switch of the at least one first switch is vertically aligned with or under the substrate, while another switch of the at least one first switch is vertically offset from or not under the substrate.

14. The inductor device of claim 12, wherein when a conducting state of one of the at least one first switch and the at least one second switch changes, the inductance value of the inductor element changes, wherein the inductance value of the inductor element differs depending on whether the sub ground planes are connected through the at least one first switch; and wherein the inductance value of the inductor element varies when the at least one second switch changes a grounding relationship of at least one of the sub ground planes.

15. The inductor device of claim 12, wherein when the inductor element is a single ended inductor element, the inductance value of the inductor element changes when a conducting state of one of the at least one first switch and the at least one second switch changes, wherein the inductance value of the inductor element differs depending on whether the sub ground planes are connected through the at least one first switch; and wherein the inductance value of the inductor element varies when the at least one second switch changes a grounding relationship of at least one of the sub ground planes.

* * * * *